United States Patent [19]
Telle

[11] Patent Number: 5,105,266
[45] Date of Patent: Apr. 14, 1992

[54] SINGLE PASS COLOR SUBSTITUTION

[75] Inventor: Lawrence B. Telle, Rochester, N.Y.

[73] Assignee: Eastman Kodak Company, Rochester, N.Y.

[21] Appl. No.: 443,544

[22] Filed: Nov. 30, 1989

[51] Int. Cl.⁵ .............................................. G03F 3/08
[52] U.S. Cl. ..................................... 358/80; 358/78; 355/326
[58] Field of Search ............... 358/75, 78, 80, 474, 358/486; 355/208, 326

[56] References Cited

U.S. PATENT DOCUMENTS

| | | | |
|---|---|---|---|
| 4,058,828 | 11/1977 | Ladd | 358/80 |
| 4,204,728 | 5/1980 | Goshima et al. | 355/4 |
| 4,538,182 | 8/1985 | Saito et al. | 358/280 |
| 4,791,450 | 12/1988 | Mosehauer et al. | 355/4 |
| 4,855,765 | 8/1989 | Suzuki et al. | 346/154 |
| 4,896,208 | 1/1990 | Moriya et al. | 358/75 |
| 4,935,779 | 6/1990 | Sawada | 355/326 |
| 4,937,636 | 6/1990 | Rees et al. | 355/326 |
| 4,937,662 | 6/1990 | Matsunawa et al. | 358/80 |
| 4,998,144 | 3/1991 | Karn | 355/326 |

FOREIGN PATENT DOCUMENTS

0259981 3/1988 European Pat. Off. .
0269334 6/1988 European Pat. Off. .
0310388 4/1989 European Pat. Off. .

Primary Examiner—James J. Groody
Assistant Examiner—Kim Yen Vu
Attorney, Agent, or Firm—Milton S. Sales

[57] ABSTRACT

A copier capable of selectively changing an original color on a document to a target color on a copy, includes a digitizer for designating a spacial coordinate at which appears the original color to be changed to a target color. In a single scan, a scanner generates a series of electrical signals characteristic of the image content of the document, including the image content at the designated spacial coordinate. The generated signals are stored in a full page memory. As the stored signals are read from memory and supplied to a writer, color substitution is effected to the stored signals generated from portions of the document having a color substantially the same as that at the designated coordinate.

16 Claims, 5 Drawing Sheets

SINGLE PASS COLOR SUBSTITUTION

BACKGROUND OF THE INVENTION

1. Technical Field

This invention relates generally to digital color copiers, and more particularly to such copiers capable of processing a color image signal to reproduce a given color as a different color.

2. Background Art

U.S. Pat. No. 4,204,728, which issued to Goshima et al. on May 27, 1980, discloses an optical copier which uses color filters to produce color separation electrostatic images on a photosensitive medium for development with cyan, magenta and yellow toners. Color conversions are effected by selection of proper filter combinations, but all colors of the original except for the three monochromatic elements yellow, magenta, and cyan will be reproduced in different colors from those of the original. It is impossible to replace only a particular color with another.

U.S. Pat. No. 4,538,182, which issued to S. Saito et al. on Aug. 27, 1985, discloses a copier which reproduces a plurality of particular colors, for example red and black, in which the original red will be changed to black or the original black will be changed to red. However, it is impossible to change a color containing a plurality of color components to another.

U.S. Pat. No. 4,855,765, which issued to Suzuki et al. on Aug. 8, 1989, discloses a digital color copier which can replace a selected particular color in an origial with a desired designated color. The color to be replaced and the replacing color can be selected from a pre-set list or 24 different colors stored in ROM. This has the drawback of limiting the selectable colors to only those pre-programmed into the ROM. In another embodiment of the Suzuki et al. patent, signals representing the color to be replaced are stored in RAM during a preliminary scan. When the stored color signals do not coincide with color input image signals read during a subsequent scan, the input signals are printed unchanged. When the stored color signals coincide with the input image signals, the input signals are replaced with signals of another designated color. This second embodiment requires two scans; one to store the color to be replaced, and one to read the image.

A copier's life is in part limited by the physical number of times the image is scanned, and the inconvenience of the operators is measured in part by the time duration they must wait to remove the original after pressing the start button. A copier which requires only a single scan to determine the color to be replaced, to determine the replacing color, and to read the image data would be very preferable to a copier which requires two or more scans for the same functions.

DISCLOSURE OF INVENTION

It is an object of the present invention to provide a copier with the capability to determine the color to be replaced, to determine the replacing color, and to read the image data in but a single scan of the original.

In Accordance with one aspect of the present invention, a copier capable of selectively changing an original color on a document to a target color on a copy, includes means for designating spacial coordinate at which appears the original color to be changed to a target color. In a single scan, a scanner generates a series of electrical signals characteristic of the image content of the document, including the image content at the designated spacial coordinate. The generated signals are stored in a full page memory. As the stored signals are read from memory and supplied to a writer, color substitution is effected to the stored signals generated from portions of the document having a color substantially the same as that at the designated coordinate.

In accordance with another aspect of the present invention, a copier capable of selectively changing an original color on a document to a target color on a copy includes means for designating a spacial coordinate at which appears the original color to be changed to a target color, means for designating a target color, and scanning means for generating, during a single scan of a document, a series of electrical color data signals characteristic of a scanned image, including a signal characteristic of the color of the scanned image at the designated spacial coordinate. The generated series of data signals for the scanned image are stored in a full page memory, and image forming means are provided for forming a color copy based on a supplied series of electrical color data signals. As the stored series of data signals are retrieved from the memory means, it is determined whether the retrieved color data signals corresponding to various positions on the scanned image substantially match the stored signal characteristic of the color at the designated spacial coordinate. The image forming means is selectively supplied with one of (1) the retrieved color data signal or (2) a signal characteristic of said target color signal.

In a preferred embodiment of the present invention, the copier includes a full page buffer for storing the series of data signals from a full document page, a first register for storing the signal characteristic of the color of the scanned image at the designated spacial coordinate, and a second register for storing a signal characteristic of the target color. The means for designating the target color includes means for designating a second spacial coordinate at which appears the target color. The second spacial coordinate is scanned into the memory means during the single scan. The second spacial coordinate at which appears the target color may be on the original document or on a color palette. Alternatively, the target color designating means may include memory means in which a plurality of possible target colors are stored.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The present description will be directed in particular to elements forming part of, or cooperating more directly with, apparatus in accordance with the present invention. It is to be understood that elements not specifically shown or described may take various form well known to those skilled in the art.

Figure 1:
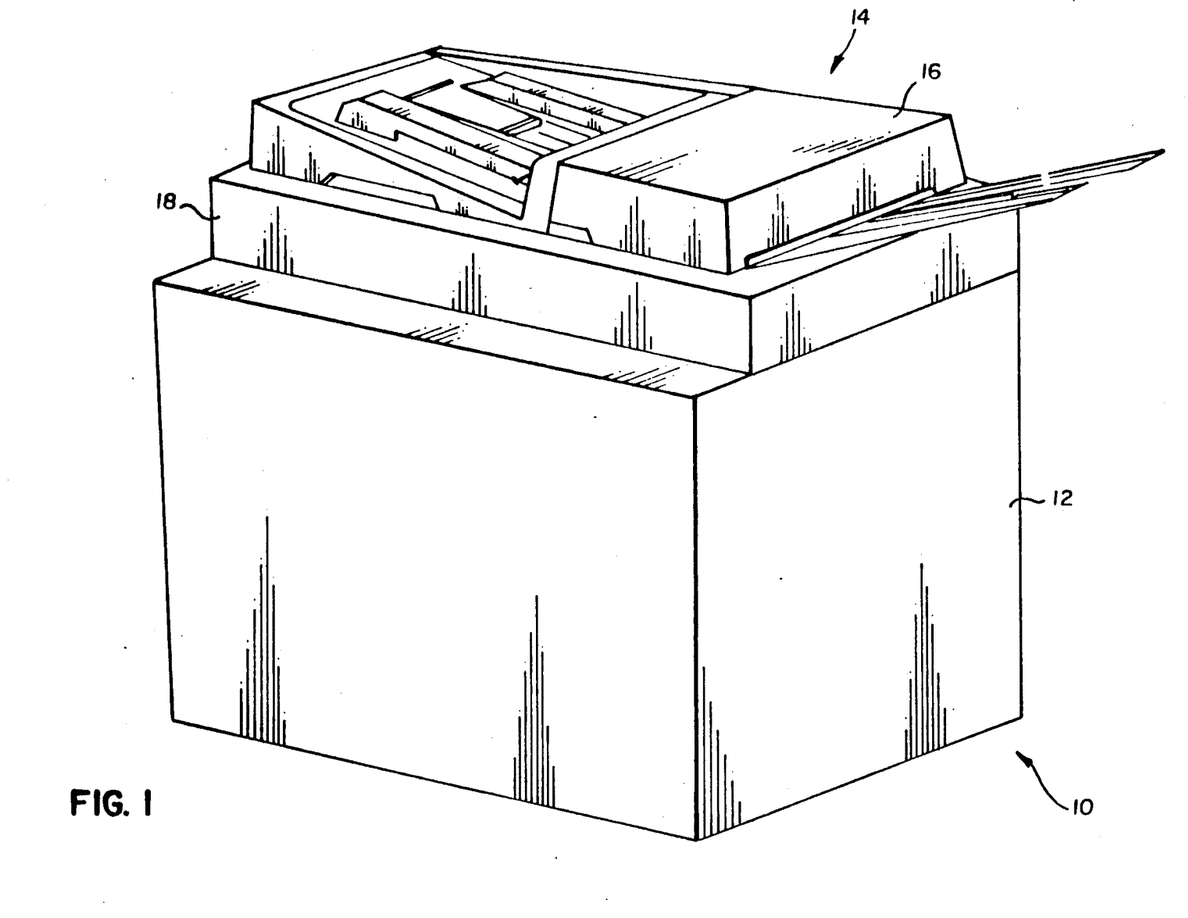
FIG. 1 is a perspective view of a copier according to one embodiment of the present invention.

According to FIG. 1, a copier 10 includes a marking engine 12 and a document scanner 14. The document scanner produces a series of electrical signals representative of the image content of originals. Scanner 14 consists of an automatic document handler 16 for stream feeding multiple hard copy original pages past an optical system enclosed in an optics housing 18 to be automatically read by a scanning device 20 such as a linear array of solid-state charge-coupled devices (see also FIG. 2). The scanning device scans the originals pages, converting their images to a series of electrical signals in page format for input to marking engine 12.

Figure 2:
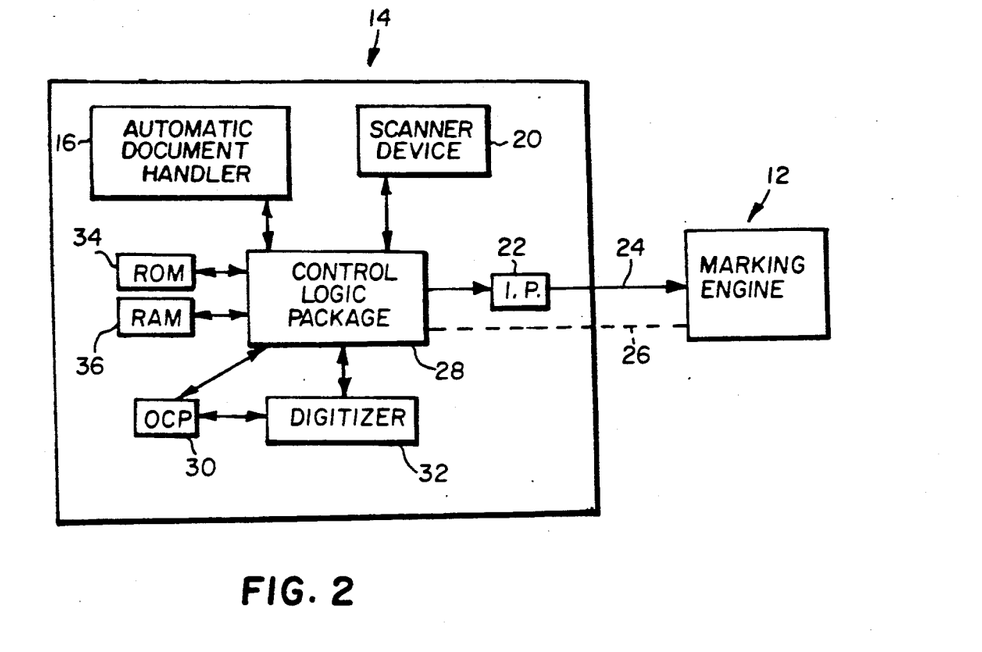
FIG. 2 is a schematic block diagram of the copier of FIG. 1.

Still referring to FIG. 2, the electrical signals from scanning device 20 may be manipulated by image processing electronics 22. Image processing electronics 22 will be discussed in more detail below with reference to FIG. 4. The processed electrical signals are transmitted along an image data bus 24 to marking engine 12. Synchronization signals to identify different scan lines, and to provide page information and marking engine control, is transmitted along a job control communications link 26.

Document scanner 14 also includes a control logic package 28 having an operator control panel 30 and digitizer 32. The control logic package is an interfacing medium for the operator to input functions and to receive messages from the reproduction apparatus. Setup instructions are input to the scanner, while imformation for finishing and processing of jobs will be sent to marking engine 12. The logic package consists of control software, interface software, and logic hardware.

As way of example only, functions inputted by the operator at the control panel may include image editing features such as area erase (blanking and framing), image shift, book copy modes, magnification, accent (spot) color, color substitution, positive-to-negtive image reversal, forms overlay, highlighting, screening selected areas for breaking a continuous tone original into dots for reproduction as halftone images, etc.

Digitizer 32 may take any of several well known forms such as the digitizing tablet disclosed in U.S. Pat. No. 4,791,450, wherein an original is placed face up on the tablet. A stylus associated with the tablet is used by the operator to designate various positions on the original. Transducers located beneath the original produce signals relating the position of the positions touched relative to an edge of the tablet. Alternatively, the tablet may be of the known sonic type wherein a spark formed by a stylus creates sound waves in the air which are sensed by microphones placed along the sides of the tablet or wherein a sensor is placed in the stylus and sources at known points on the sides of the tablet emit sonic signals.

Default machine setup instructions are stored in a ROM 34. An operator uses control panel 30 and digitizer 32 to input additional or alternative setup instruction values for storage in a RAM 36. Alternatively, setup instructions may be received via removable memory media from an off line computer, or the like. The setup instructions are used by image processing electronics 22 to modify the image data from scanning device 20, or are transmitted as control signals to marking engine 12.

Marking engine 12 receives electrical bit stream signals over data bus 24 and job control data over communications link 26. After appropriate processing, the image signals are inputted to a writer for forming images on receiver sheets.

Figure 3:
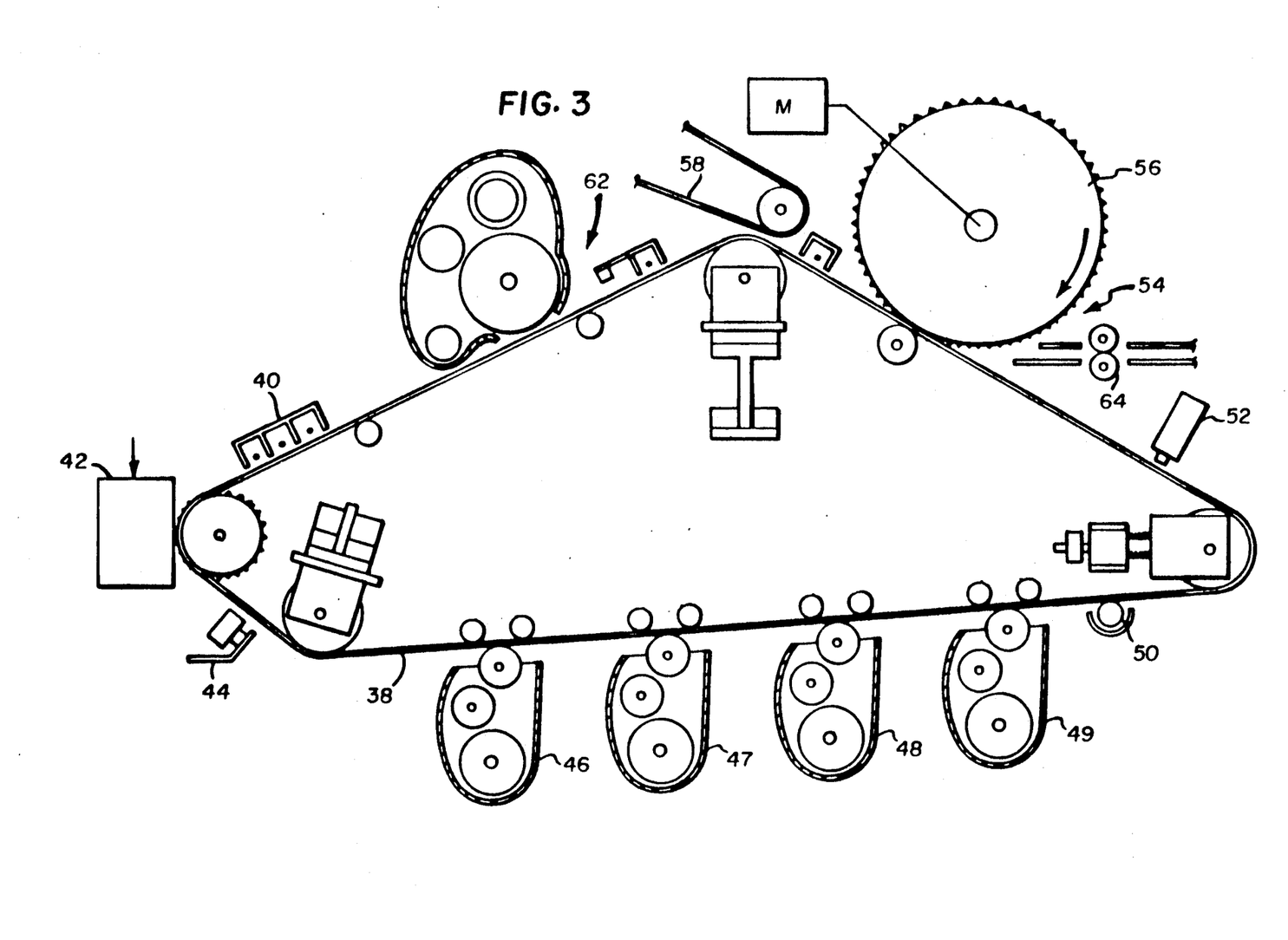
FIG. 3 is a schematic diagram of a portion of the copier of FIG. 1.

Referring to FIG. 3 a film core portion of marking engine 12 includes an image bearing member, for example, an endless electrophotoconductive web 38 entrained about a series of primary rollers and other supporting structure. Web 38 moves past conventional charging station 40, LED printhead exposure station 42, electrometer 44 which senses the level of a charge existing after exposure, and a series of toning or developing stations 46, 47, 48 and 49. Each image created by printhead 42 is toned by one of the toning stations. After being toned the web passes a magnetic scavenger 50 and a densitometer 52 which measures the density of the toner image also for use in controlling the process. The toner image then proceeds to a transfer station 54 where the image is transferred to a transfer surface of a receiver sheet carried by a transfer drum 56 for repeated presentation of a receiver sheet to web 38.

When the copier is operating in a multi-image mode, for example, a multicolor mode, consecutive images or pairs of images are toned with different colored toners using the different toning stations 46–49. These consecutive images are transferred in registry to the receiver sheet as it repeatedly is brought into transfer relation with web 38 by drum 56. After the transfer operation is complete, the receiver sheet is stripped from the drum, and then from the web by an electrostatic sheet transport mechanism 58. The sheet is transported to a fuser, not shown, and the web is then cleaned by the application of a neutralizing corona and a neutralizing erase lamp and a magnetic brush cleaning mechanism all located at a cleaning station 62.

Transfer station 54 receives sheets of one particular size from a supply, not shown, through timing rollers 64. In response to a signal from the logic and control of the apparatus, not shown, timing rollers 64 accelerate to drive the receiver sheet into the nip between transfer drum 56 and the web as the first toner image to be transferred approaches the nip.

Preferably, scanning device 20 of FIG. 2 comprises a pair of linear CCD arrays. One line of CCD elements responds to green light and the other line of elements are alternately responsive to red and blue light. Therefore, as shown schematically in FIG. 4, electrical signals characteristic of the green "G" content of the scanned image are emitted from scanning device 20 via one channel 70, while electrical signals alternately characteristic of the red "R" and blue "B" content of the scanned image are emitted from scanner 20 via a second channel 72. For the purposes of this disclosure, it will be assumed that the G,R,B electrical output signals from scanning device 20 are linear measures of relative green, red, and blue reflectances of each successive location in a raster on a black-and-white or color original document. It is to be understood that the invention is equally applicable to the generation and processing of signals derived from document transmittances. Furthermore, the electrical signals may represent luminance, red, and blue instead of green, red, and blue information since the direct optical generation of a luminance signal may have an advantage in signal-to-noise ratios, and further that only the luminance signal is required for a black-and-white or monochrome document. See for example U.S. Pat. No. 4,058,828.

Figure 4:
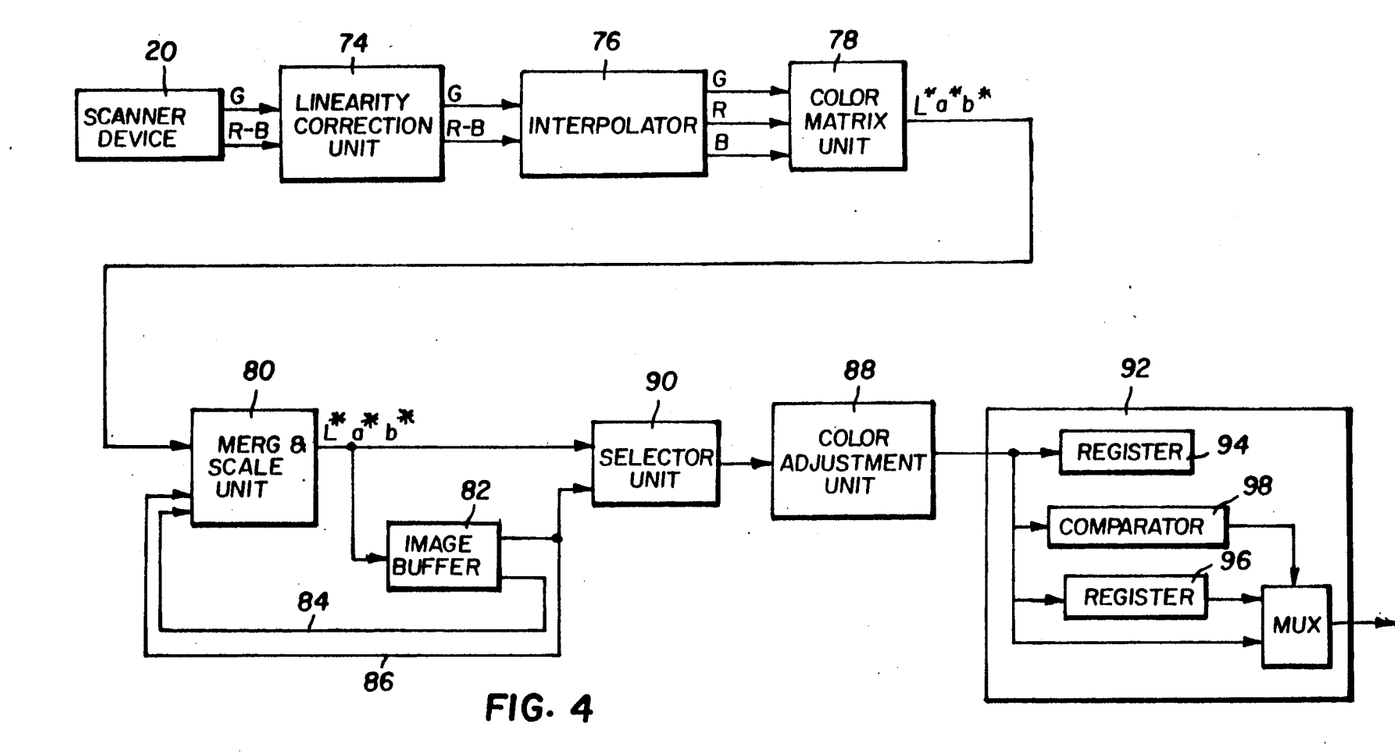
FIG. 4 is a schematic block diagram of the image data path of the copier of FIG. 1.

As mentioned above, the scanning device is preferably formed of a pair of linear arrays, one for green and the other for red and blue. Generally, there will be an inherent phase delay betwen the two arrays. Hence, it may be required to add an internal line delay in the scanning device for the first channel. Equalization of phase delay assures that the simultaneous input amplitudes of green, red and blue signals to a linearity correction unit 74 correspond to the same location on the original document being scanned.

Linearity correction unit 74 provides calibration and control of system gain functions for shaping of the signals to correct for non-linearities between CCD elements, such as for example as disclosed in commonly assigned co-pending U.S. patent application Ser. No. 263,461 filed in the names of M. Potuchek et al. on Oct. 27, 1988. It also provides calibration of D.C. restoration level signals for automatic offset control of the signals from the array as disclosed in commonly assigned co-pending U.S. patent application Ser. No. 263,462 filed in the names of M. Stefanik et al. on Oct. 27, 1988. An interpolator 76 expands the R,B signal to the same cross-track resolution as the G signal.

The G, R, and B outputs of interpolator 76 are inputs to a color matrix unit 78. The three color signals G, R, and B together provide the coordinates for a color space which is linear with respect to reflectance (or transmittance) if the original document is intended for direct viewing. If the original document is, for example, a color photographic negative with photographic gamma of, say, 0.70, then the three color signal outputs G, R, and B from the scanning device are nearly linear with respect to the square-root of transmittance (Photographic gamma is discussed in *The Reproduction of Color*, edition 2; Robert W. G. Hunt; John Wiley and Sons, Inc.; 1967; pages 209 and 216, and in *Principles of Color Photography*; Ralph M. Evans, Welsey T. Hanson, and W. Lyle Brewer; John Wiley and Sons, Inc.; 1953; page 192 and is the slope of the generally straight line portion of the characteristic curve of a photographic emulsion).

Any nonlinear transform of a given three-dimensional color space forms a new color space. A color space is defined by a set of three attributes into which color can be divided. For example, the Munsell Renotation System defines a color space in terms of the hue, value and chroma attributes, and is not linearly related to the CIE color space which is defined in terms of luminance and the two chrominance attributes commonly called "x" and "y" (the transform is not merely a redescription of the same color space in rectangular and in cylindrical coordinates).

The output electrical signals from color matrix unit 78 provide the coordinates for a color space which is, insofar as possible, linear with respect to human visual color tolerance errors. For example, commonly used near uniform color spaces include CIELUV (L*,u*,v*) and CIELAB (L*,a*,b*) spaces. The latter is illustrated in the drawings. Electrical color signals L*, a*, and b* provide an efficient way to represent coordinates in color space.

Image signals first pass through a merge and scale unit 80 unmodified for storage in a full page image buffer 82. By "unmodified" it is meant in a form in which the image content of the original can be retrieved. If data from an incoming page is to be merged or overlayed with partial or full image signals stored in full page image buffer 82, the data in buffer 82 is fed back to merge and scale unit 80 along feedback paths 84 and 86 which are provided for windowed and page data, respectively. Unit 80 is also capable of merging or overlaying the two feedback paths together. The unit can also scale the image.

By placing image buffer 82 offline, it can retain the unmodified image until a test print has been run and accepted by the operator. In that way, merging, scaling, and color adjustments and substitutions (as explained below) can be inspected and, if unacceptable, redone from the original image data.

The color image data enters a color adjustment unit 88 from either merge and scale unit 80 or form image buffer 82 as determined by a selector unit 90. In the color adustment unit, the signal is acted upon to set color balance in response to operator settings of gain and offset controls.

As explained below, the operator has identified a color on the original for which a different color is to be substituted. This identification is effected by designating a position coordinate of the original at which the color to be changed is located.

As the original is scanned into image buffer 82, the color image signal passes pixel by pixel into a color substitution unit 92. When the signal representing the pixel designated as the color to be changed reaches the color substitution unit, its color value is stored in a register 94 in the color substitution unit. It may be advantageous to store the average color value of a number of pixels surrounding the designated pixel so that any irregularities in the original (such as, for example, if the original were a halftone image) are averaged out.

During the setup procedure, the operator has also identified a color to be substituted for the color to be changed. This new color is referred to herein as the "target" color. Identification of the target color may be effected by designating a position on the original or a color palette from which the color can be scanned, or by selecting one of a plurality of pre-designated colors from memory. The target color is stored in a second register 96 in color substitution unit 82.

Color signal substitution unit 82 includes a comparator 98. Upon recall of the image data stored in buffer 82, the color signal for each pixel entering color substitution unit 92 is compared to the data stored in the register 94.

If a match is found between the color signal of a pixel coming from buffer 82 and the stored signal representing the color to be changed, the data for that pixel is replaced by the data in target color register 96. Of course there must be provided sufficient range between the specific color data stored in register as the color to be changed and the image data so that colors close to the stored color will also be changed. The actual amount of the permissible difference which might occur and still be considered to be a match is a matter of choice, but it is to be recognized that the scope of this invention extends to some degree of mismatch between the designated color and the image data while still causing a substitution.

Figure 5:
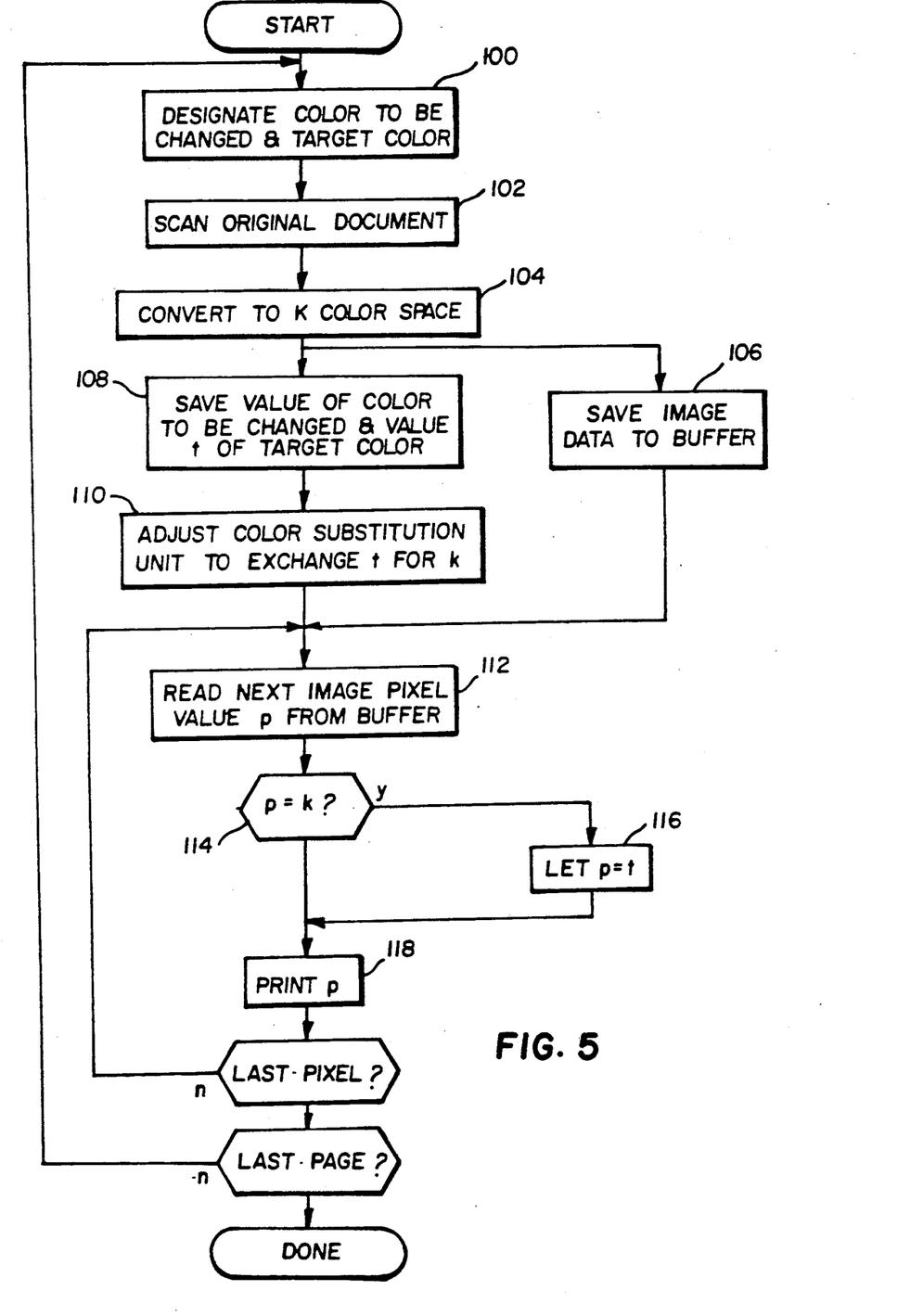
FIG. 5 is a logic flow chart of the operation of the copier of FIG. 1.

Operation of the copier will now be explained with reference to FIG. 5. In the color substitution mode, an operator places an original to be copied onto digitizer 32 (FIG. 2) and designates coordinates of the original at which is located the color to be changed. The operator then identifies the color to be substituted, or target color. This identification may be done by designating the coordinates at which the target color appears on the original or on a color palette which will be scanned off the platen during the scan of the original. Alternatively, the target color may be selected from a plurality of colors pre-designated in memory. In FIG. 5, this is step 100.

The original is then scanned (step 102) and the color image data is converted to a uniform color space "K" (step 104) and stored in image buffer 82 (step 106). While image data is being read into buffer 82, it is also inputted to register 94 of color substitution unit 92. At some time during the scanning operation, the scanner reaches the designated coordinate of the original at which the color to be replaced is located. The color value "k" of the pixel in the new color space "K" at the designated coordinate is saved in register 94. The target color value "t" is saved in register 96 in a similar manner (step 108). Once the values "k" and "t" are saved, the color substitution unit is adjusted to substitute "t" for "k" in the data stream (step 110).

It should be recognized that the value "k" may represent a range of values. By allowing "k" to be a range, pixels having a color nearly, but not exactly the same as the color of the designated color to be changed will be changed. The range may be adjustable to give the operator control over how close a color match must be before substitution occurs.

Now, and without rescanning the original, color image data can be read from image buffer 82 and sent a pixel at a time to marking engine 12 through color substitution unit 96 (step 112). The color value "p" of each pixel is compared to the value "k" of the color to be changed. If close enough (step 114), the value "t" of the target color is substituted for the pixel's original color value "p" (step 116). The resultant color value of the pixel is sent to the marking engine (step 118) and the next pixel value is read from image buffer 82.

The invention has been described in detail with particular reference to preferred embodiments thereof, but it will be understood that variations and modifications can be effected within the spirit and scope of the invention.

What is claimed is:

1. A copier capable of selectively changing an original color on a document to a target color on a copy, said copier comprising:

means for designating a spacial coordinate at which appears the original color to be changed to a target color;

means for designating a target color;

scanning means for generating, during a single scan of a document, a series of electrical color data signals characteristic of a scanned image, including a signal characteristic of the color of the scanned image at the designated spacial coordinate;

memory means for storing the generated series of data signals for the scanned image;

image forming means for forming a color copy based on a supplied series of electrical color data signals;

means for retrieving the stored series of data signals from said memory means;

means for determining whether the retrieved color data signals corresponding to various positions on the scanned image substantially match the stored signal characteristic of the color at the designated spacial coordinate; and means, operative in accordance with an output from said determining means, for selectively supplying to said image forming means one of (1) the retrieved color data signal or (2) a signal characteristic of said target color signal.

2. A copier as defined in claim 1 wherein said memory means includes a full page buffer for storing the series of data signals from a full document page.

3. A copier as defined in claim 1 wherein said memory means includes:

a full page buffer for storing the series of data signals from a full document page; and a register for storing said signal characteristic of the color of the scanned image at the designated spacial coordinate.

4. A copier as defined in claim 1 wherein said memory means includes:

a full page buffer for storing the series of data signals from a full document page;

a first register for storing said signal characteristic of the color of the scanned image at the designated spacial coordinate; and a second register for storing a signal characteristic of the target color.

5. A copier as defined in claim 1 wherein said selective supplying means is capable of supplying the signal characteristic of said target color within only a predetermined window area of the document.

6. A copier as defined in claim 1 wherein said target color designating means includes means for designating a second spacial coordinate at which appears the target color, said second spacial coordinate being scanned into said memory means during said single scan.

7. A copier as defined in claim 1 wherein said second spacial coordinate at which appears the target color is on the original document.

8. A copier as defined in claim 1 wherein said second spacial coordinate at which appears the target color is on a color palette.

9. A copier as defined in claim 1 wherein said target color designating means includes memory means in which a plurality of possible target colors are stored.

10. A copier as defined in claim 1 wherein said spacial coordinate at which appears the original color to be changed to a target color is on the original document.

11. A copier capable of selectively changing an original color on a document to a target color on a copy, said copier comprising:

means for designating a spacial coordinate at which appears the original color to be changed to a target color;

means for scanning a document to generate a series of electrical signals characteristic of the image content of the document, including the image content at the designated spacial coordinate, in a single scan;

full page memory means for storing the generated signals;

writer means for creating a copy from image signals supplied thereto;

means for reading the stored signals from the memory means and supplying the signals to said writer means; and means for effecting color substitution to the stored signals generated from portions of the document having a color substantially the same as that at the designated coordinate as the stored signals are read from the memory means.

12. A method of selectively changing an original color on a document to a target color on a copy, said method comprising:

designating a spacial coordinate at which appears the original color to be changed to a target color;

designating a target color;

scanning the document and generating, during a single scan of the document, a series of electrical color data signals characteristic of a scanned image, including a signal characteristic of the color of the scanned image at the designated spacial coordinate;

storing the generated series of data signals for the scanned image;

forming a color copy based on a supplied series of electrical color data signals;

retrieving the stored series of color data signals from said memory means;

determining whether the retrieved color data signal corresponding to various positions on the scanned image substantially match the stored signal characteristic of the color at the designated spacial coordinate; and in accordance with an output from said determining means, selectively supplying to said image forming means one of (1) the retrieved data signal or (2) a signal characteristic of said target color signal.

13. A method as defined in claim 12 wherein said selective supplying step includes supplying the signal characteristic of said target color within only predetermined window of the document.

14. A method as defined in claim 12 wherein said target color designating step includes designating a second spacial coordinate at which appears the target color, said second spacial coordinate being scanned into said memory means during said single scan.

15. A method as defined in claim 12 wherein said second spacial coordinate at which appears the target color is on the original document.

16. A method as defined in claim 12 wherein said second spacial coordinate at which appears the target color is on a color palette.

* * * * *